(12) United States Patent
Yamaguchi

(10) Patent No.: US 7,540,571 B2
(45) Date of Patent: Jun. 2, 2009

(54) MOTOR-DRIVEN DISK BRAKE SYSTEM

(75) Inventor: Tohma Yamaguchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 212 days.

(21) Appl. No.: 11/090,208

(22) Filed: Mar. 28, 2005

(65) Prior Publication Data

US 2005/0258683 A1    Nov. 24, 2005

(30) Foreign Application Priority Data

May 19, 2004    (JP)    ............................. 2004/149262
Aug. 31, 2004   (JP)    ............................. 2004/252139

(51) Int. Cl.
 *B60R 25/08*    (2006.01)
(52) U.S. Cl. ........................... 303/89; 303/20; 188/162; 188/265; 188/71.9
(58) Field of Classification Search ................... 303/89, 303/20, 122.08; 188/162, 163, 165, 156, 188/71.9, 72.1; 310/12, 13, 14, 91
See application file for complete search history.

(56) References Cited

U.S. PATENT DOCUMENTS

| 5,348,123 | A * | 9/1994 | Takahashi et al. ........... 188/72.1 |
| 6,315,092 | B1 * | 11/2001 | Schwarz ...................... 188/265 |
| 6,626,270 | B2 * | 9/2003 | Drennen et al. ............. 188/72.1 |
| 6,854,572 | B2 * | 2/2005 | Usui .......................... 188/72.8 |
| 6,915,883 | B2 * | 7/2005 | Watanabe et al. ........... 188/156 |
| 6,959,791 | B2 * | 11/2005 | Usui .......................... 188/72.1 |
| 2004/0201270 | A1 * | 10/2004 | Suzuki et al. ................. 303/20 |
| 2004/0212249 | A1 | 10/2004 | Yamaguchi et al. |

FOREIGN PATENT DOCUMENTS

| JP | 2002-276704 | 9/2002 |
| JP | 2003-42199 | 2/2003 |
| JP | 2003-222172 | 8/2003 |
| JP | 2004-324856 | 11/2004 |

OTHER PUBLICATIONS

Japanese Office Action (in English language) issued Dec. 10, 2009 in Japanese Patent Application No. 2004-149262.

* cited by examiner

*Primary Examiner*—Robert A Siconolfi
*Assistant Examiner*—Mariano Sy
(74) *Attorney, Agent, or Firm*—Wenderoth, Lind & Ponack, L.L.P.

(57) ABSTRACT

When a solenoid is operated so as to move an engaging pawl to a disengaged position, if a displacement detection device (an angular position sensor and a controller) detects that a motor rotor has not been displaced by an amount equal to or exceeding a predetermined level, that is, if the motor has not returned by an amount equal to or exceeding the predetermined level within a predetermined time period, a defect in an unlocked condition (an unlocking failure of a park braking lock mechanism) is determined. In this case, a driver is notified of the failure, so that prompt action can be taken to rectify the unlocking failure of the park braking lock mechanism.

18 Claims, 12 Drawing Sheets

MOTOR-DRIVEN DISK BRAKE SYSTEM

BACKGROUND OF THE INVENTION

The present invention relates to a motor-driven disk brake system for generating a braking force by means of a torque of a motor. More specifically, the present invention relates to a motor-driven disk brake system provided with a park braking function.

As an example of a motor-driven disk brake system, there can be mentioned a motor-driven disk brake system comprising a caliper having provided therein a piston, a motor and a rotary-linear motion conversion mechanism for enabling rotation of the motor to be converted to a linear motion and transmitted to the piston. A thrust is imparted to the piston according to rotation of a rotor of the motor, to thereby press a brake pad against a disk rotor, thus generating a braking force. Normally, in this motor-driven disk brake system, a force applied by a driver to a brake pedal, or a stroke of the brake pedal, is detected by a sensor, and rotation (an angle of rotation) of the motor is controlled based on a value detected by the sensor, to thereby obtain a desired braking force.

Recently, various attempts have been made to increase an advantage of such a motor-driven disk brake system by providing the system with a park braking function.

The motor-driven disk brake has reversibility relative to a reactive force imposed by the brake pads. Therefore, to apply park braking using such a motor-driven disk brake, it is necessary to provide a means to fix the piston.

For example, in a motor-driven caliper in which a rotary motion of the motor is converted to a linear motion, a rotor of the motor is adapted to be locked by means of a solenoid actuator (hereinafter referred to simply as "the solenoid"). To use the caliper for park braking, the rotor of the motor should be locked while maintaining the solenoid in a non-energized condition. To this end, use is made of (1) a mechanism for unlocking the rotor under normal braking by placing the solenoid in an energized condition, and for locking the rotor during park braking by placing the solenoid in a non-energized condition; or (2) a mechanism using a solenoid having a latch mechanism, in which the solenoid is temporarily energized in a direction for unlocking for normal braking, and is temporarily energized in a direction for locking for park braking.

Examples of motor-driven disk brake systems of the above-mentioned type having a park braking function are disclosed in Japanese Patent Application Public Disclosure No. 2003-42199 and Japanese Patent Application Public Disclosure No. 2003-222172.

When a locking action and an unlocking action (hereinafter frequently referred to as "locking/unlocking action") for park braking are to be effected in a motor-driven disk brake, if the locking/unlocking action becomes defective (a failure of a locking action or a failure of an unlocking action occurs), the failure (hereinafter, frequently referred to as "locking/unlocking failure") should be effectively detected to enable an appropriate countermeasure to be taken. For example, to effect a locking action for park braking, if a plunger of the solenoid malfunctions, it is difficult to place the park braking lock mechanism in a locked condition. To effect an unlocking action for park braking, if the plunger of the solenoid malfunctions, an unlocked condition of park braking cannot be easily obtained. It is anticipated that such a problem could be readily solved by appropriately detecting a locking/unlocking failure. Therefore, a means to appropriately detect a locking/unlocking failure has been desired.

However, in the above-mentioned prior art techniques, there is no means provided to detect a failure of locking/unlocking during park braking.

SUMMARY OF THE INVENTION

In view of the situation described, the present invention has been made. It is an object of the present invention to provide a motor-driven disk brake system which is capable of appropriately detecting a failure to lock/unlock during park braking by means of a simple arrangement.

The present invention provides a motor-driven disk brake system comprising:
 a piston;
 a motor;
 a rotary-linear motion converting mechanism for enabling rotation of a rotor of the motor to be converted to a linear motion and transmitted to the piston;
 a caliper for pressing a brake pad against a disk rotor and thus generating a braking force when a thrust of the piston is generated according to the rotation of the rotor of the motor;
 a park braking lock mechanism including a ratchet wheel, an engaging pawl and an electric actuator, the ratchet wheel being adapted to rotate with the rotor of the motor, the engaging pawl being disposed at a periphery of the ratchet wheel, the electric actuator being adapted to move the engaging pawl between an engaged position and a disengaged position relative to the ratchet wheel; and
 a controller adapted to send a command signal to the electric actuator so as to effect a locking action or an unlocking action of the park braking lock mechanism according to movement of the engaging pawl,
 the caliper including displacement detection means adapted to detect displacement of the rotor of the motor,
 the controller including locking/unlocking failure detection means adapted to detect a locking failure or an unlocking failure of the park braking lock mechanism, based on results of detection made by the displacement detection means.

The present invention also provides a motor-driven disk brake system, comprising:
 a piston;
 a motor;
 a rotary-linear motion converting mechanism for enabling rotation of a rotor of the motor to be converted to a linear motion and transmitted to the piston;
 a caliper for pressing a brake pad against a disk rotor when a thrust of the piston is generated according to rotation of the rotor of the motor;
 a park braking lock mechanism including a ratchet wheel, an engaging pawl and an electric actuator, the ratchet wheel being adapted to rotate with the rotor of the motor, the engaging pawl being disposed at a periphery of the ratchet wheel, the electric actuator being adapted to move the engaging pawl between an engaged position and a disengaged position relative to the ratchet wheel; and
 a controller adapted to send a command signal to the electric actuator so as to effect a locking action or an unlocking action of the park braking lock mechanism according to movement of the engaging pawl,
 the caliper including a thrust sensor adapted to sense a thrusting force of the piston,
 the controller including locking/unlocking failure detection means adapted to detect a locking failure or an unlocking failure of the park braking lock mechanism, based on results of detection made by the thrust sensor.

DETAILED DESCRIPTION OF THE PREFERRED EMBODIMENTS

Figure 4:
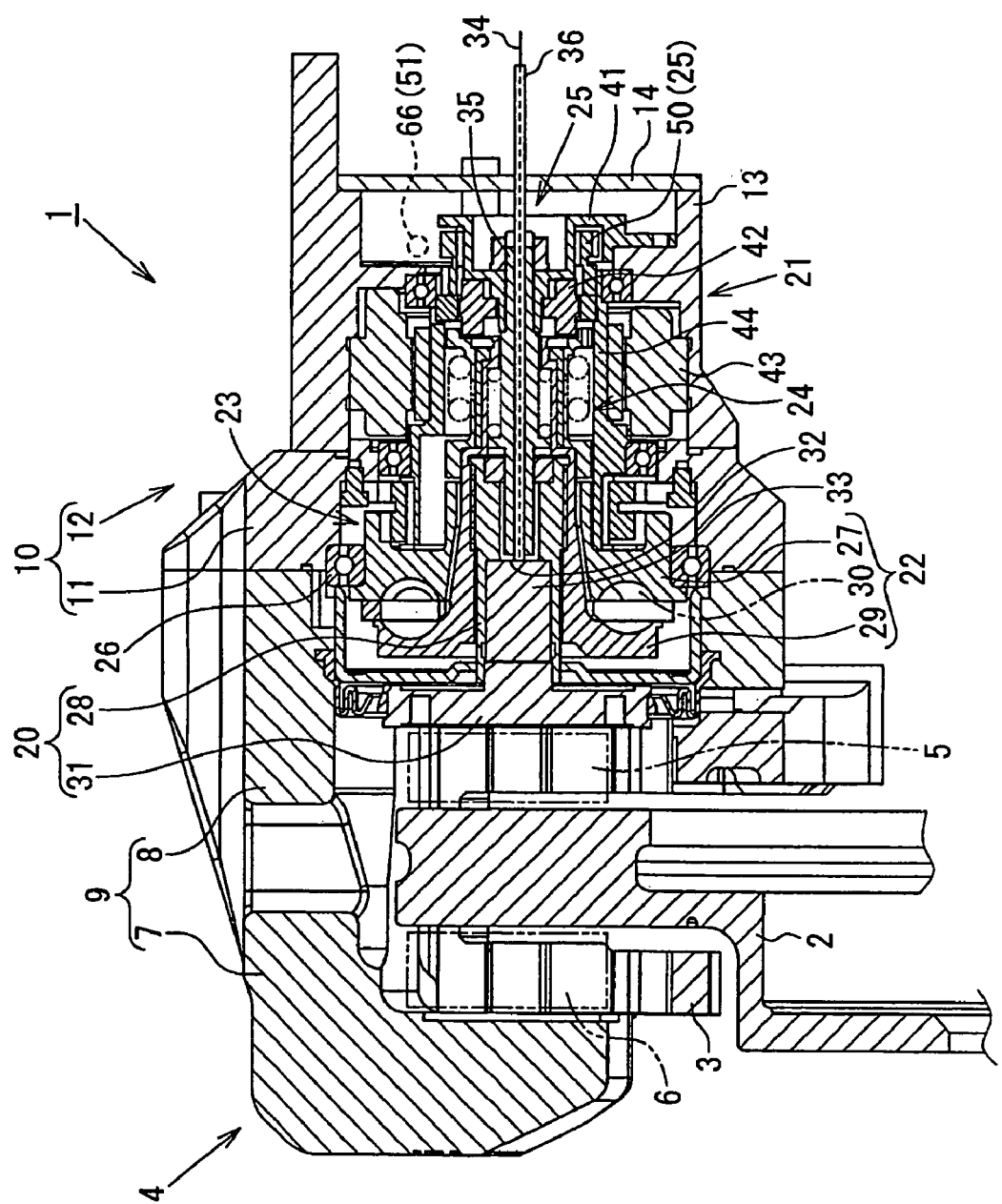
FIG. 4 is a cross-sectional view showing an entire construction of a motor-driven disk brake system according to the embodiment of the present invention.

Referring to the accompanying drawings, a motor-driven disk brake system according to an embodiment of the present invention is described below. In FIG. 4, a motor-driven disk brake system 1 comprises a caliper 4 supported by a carrier 3 that is fixed to a non-rotational portion (such as a knuckle) of a vehicle on an inner side of the vehicle relative to a disk rotor 2. The caliper 4 is supported in a state such that it is capable of a floating movement in an axial direction of the disk rotor 2. A pair of brake pads 5 and 6 are disposed so as to face each other with the disk rotor 2 being provided therebetween. The brake pads 5 and 6 are supported by the carrier 3 in such a manner as to allow movement of the brake pads 5 and 6 in the axial direction of the disk rotor 2.

The caliper 4 comprises a claw member 9 and a caliper body 10 connected to the claw member 9. The claw member 9 includes a claw portion 7 formed on a forward end thereof and an annular base body 8 formed on a basal end thereof. The claw portion 7 is disposed so as to face the brake pad 6 on an outer side of the vehicle. The caliper body 10 comprises an annular body 11 connected to the annular base body 8 of the claw member 9 and a motor case 12 connected to the annular body 11. The motor case 12 comprises a motor case body 13 in a cylindrical form connected to the annular body 11, and a motor end plate 14 covering an open end of the motor case body 13.

In the caliper 4, there are provided a piston 20 comprising separable parts, which is adapted to press the brake pad 5 (on an inner side of the vehicle) against the disk rotor 2, a motor 21, a ball ramp mechanism (a rotary-linear motion converting mechanism) 22 for enabling rotation of the motor 21 to be converted to a linear motion and transmitted to the piston 20, a differential reduction mechanism 23 for transmitting rotation of the motor 21 to the ball ramp mechanism 22 with a predetermined reduction ratio, a pad wear compensation mechanism 24 for compensating for an amount of wear of the brake pads 5 and 6 by changing a position of the piston 20 in relation to the amount of wear, and a park braking lock mechanism 25 for securing park braking. The caliper 4 comprises a bidirectional type self-holding solenoid 51 (hereinafter, referred to simply as "solenoid 51") for effecting a locking action and an unlocking action of the park braking lock mechanism 25.

The ball ramp mechanism 22 comprises a first disk 27 having a ring-like form, and which is rotatably supported by an inner circumferential surface of a connecting portion of the annular base body 8 and the annular body 11 of the caliper body 10 through a bearing 26, and a second disk 29 having a ring-like form defining an inner space at a central portion thereof. A cylindrical portion 28 of the piston 20 is inserted into the inner space. The second disk 29 is connected to the cylindrical portion 28 and held so as to be prevented from rotating. The ball ramp mechanism 22 further comprises balls 30 disposed between the disks 27 and 29. The second disk 29 is adapted to convert a force of rotation received from the first disk 27 through the balls 30 to a linear motion, and to transmit the linear motion to the piston 20.

Figure 6:
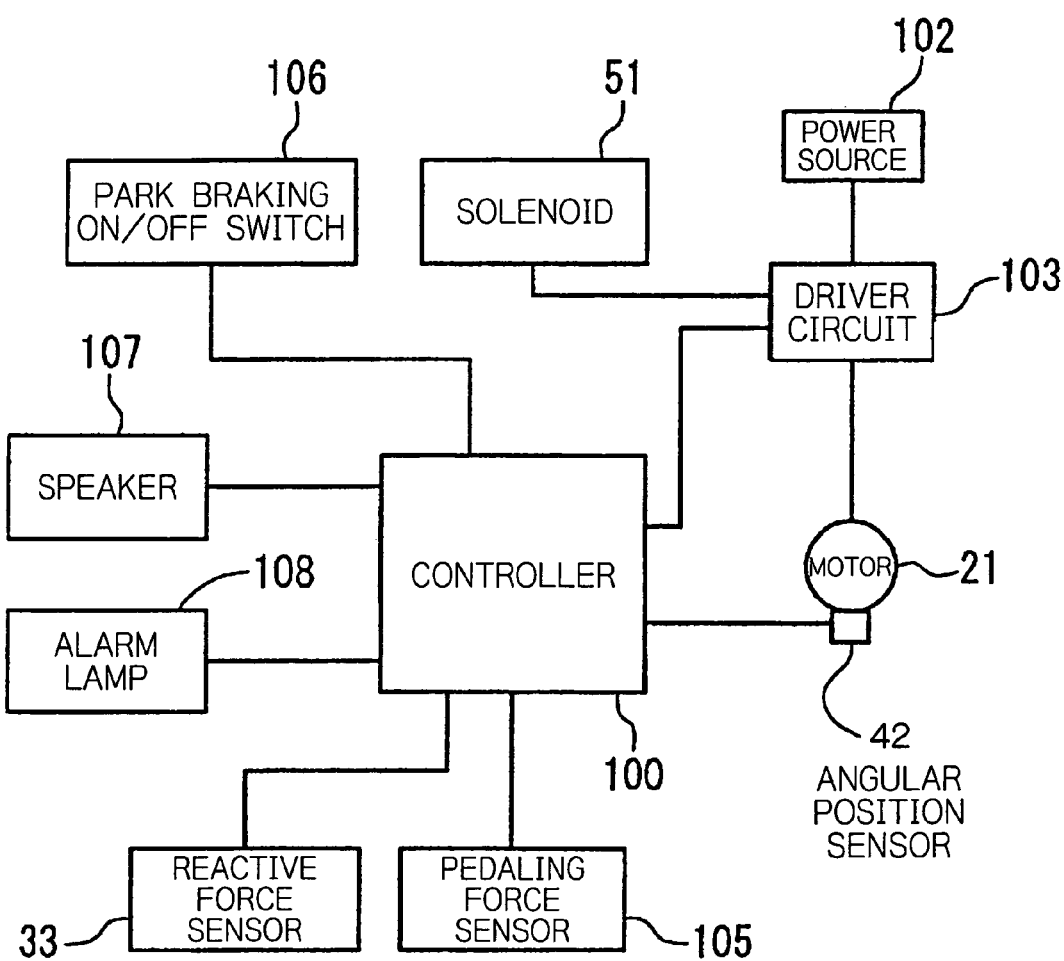
FIG. 6 is a system diagram indicating a controller and devices connected thereto in the motor-driven disk brake system of FIG. 4.

The piston 20 comprises separable parts, namely, the cylindrical portion 28 and a piston body 31 having a larger diameter than the cylindrical portion 28. The piston body 31 is adapted to receive a force from the cylindrical portion 28 and hence the ball ramp mechanism 22 (and hence the motor 21). The cylindrical portion 28 is supported by a support cylinder 35 (described later) through a piston engaging member (no reference numeral therefor is indicated) while being prevented from rotating. A reactive force sensor (a thrust sensor) 33 is provided between the piston body 31 and a closed end 32 of a hollow portion formed in the cylindrical portion 28 on a side of the piston body 31, so as to detect a reactive force from the piston body 31 (and hence a thrusting force of the piston 20). A signal wire 34 of the reactive force sensor 33 passes through a pipe 36 which is inserted through the support cylinder 35, and connected to a controller 100 provided in a vehicle body as shown in FIG. 6. The support cylinder 35 is supported by the motor case 12 through a cylindrical support member 41.

Figure 7:
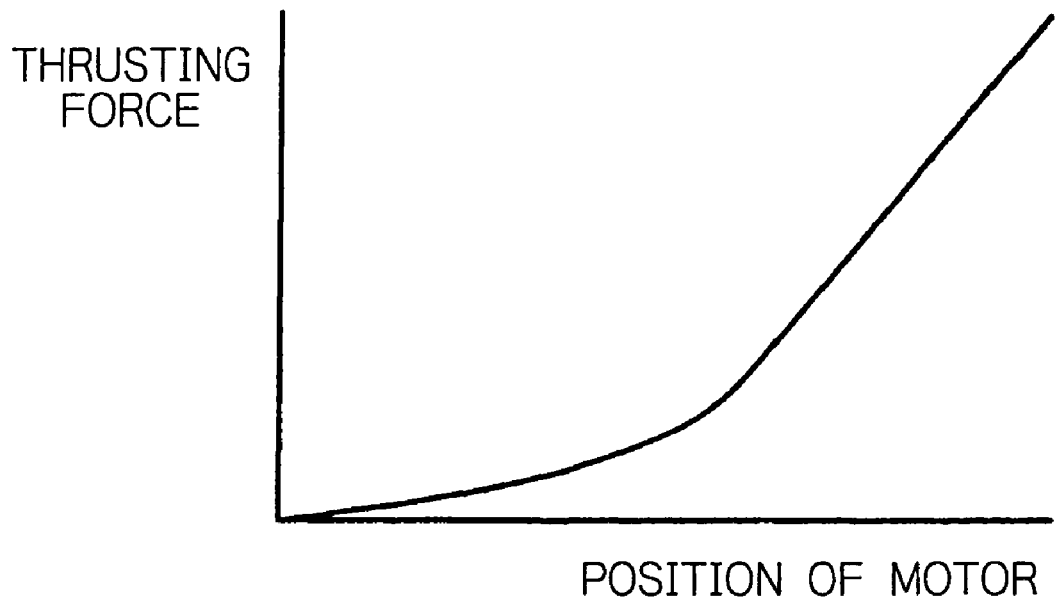
FIG. 7 is a characteristic diagram indicating the relationship between a position of a motor in FIG. 1 and a thrusting force.

The motor 21 comprises a stator 43 fixed in a fitted relationship to the motor case 12, and a rotor 44 having a hollow structure and which is disposed within the stator 43. The rotor 44 is rotatably supported by the motor case 12. The motor 21 is operated according to a command signal from the controller 100 so as to rotate the rotor 44 through a desired angle with a desired torque. The angle of rotation of the rotor 44 is detected by an angular position sensor (a displacement detection means) 42, such as a resolver, disposed in the rotor 44. In this embodiment, in response to a command signal from the controller 100 for generating a braking force, the motor 21 rotates the rotor 44 in a clockwise direction R in FIG. 2. The controller 100 is adapted to detect an amount of displacement (an amount of return movement) of the rotor 44, based on an angular position of the rotor 44 detected by the angular position sensor 42, thus forming in combination with the angular position sensor 42 a displacement detection means. A particular relationship exists between the angle of rotation of the rotor 44 (and hence the angular position of the motor 21) and a thrusting force, which is substantially as indicated in FIG. 7.

The controller 100 controls not only the motor 21, but also controls the solenoid 51 (and hence the park braking lock mechanism 25) through a driver circuit 103 as described later.

Figure 1:
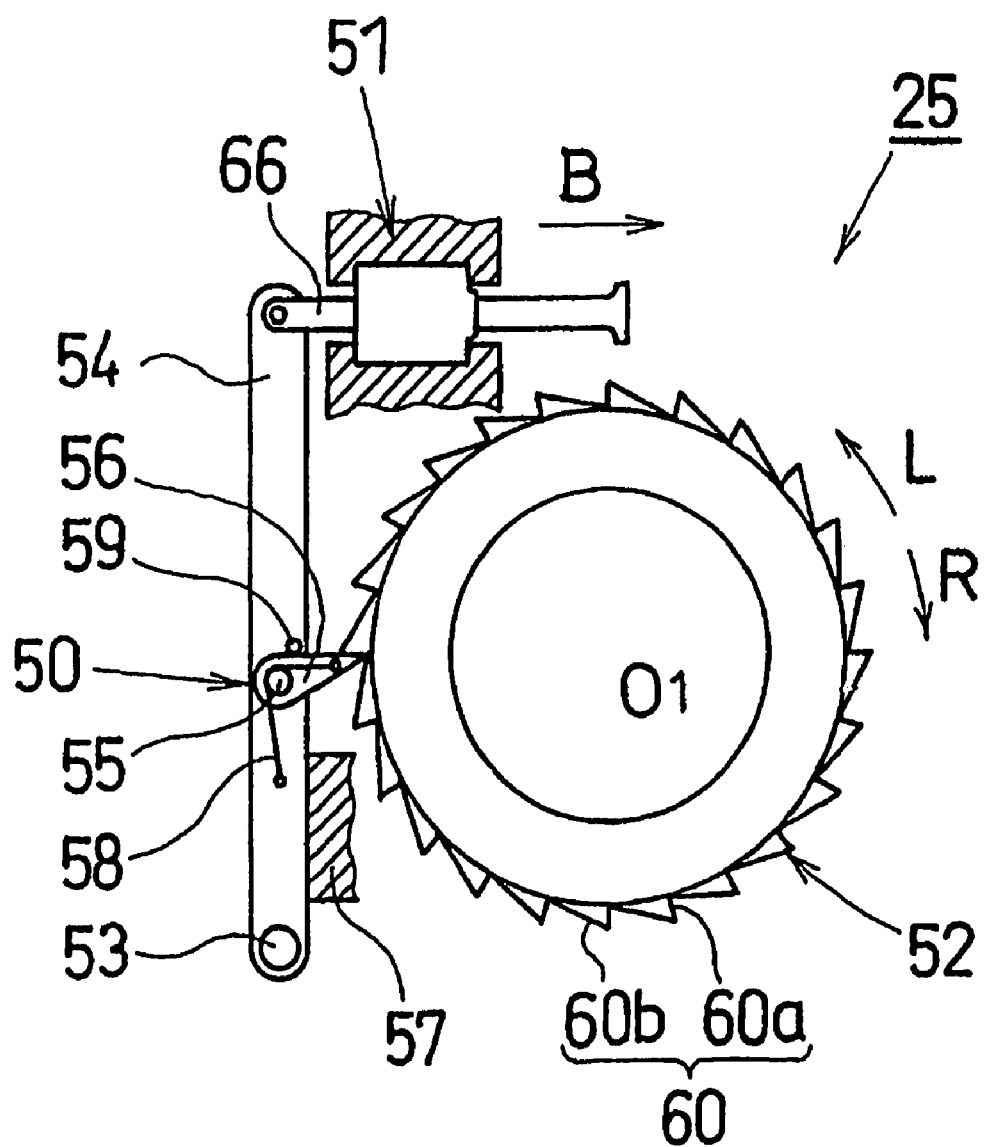
FIG. 1 is a schematic diagram indicating a locked condition of a park braking lock mechanism according to an embodiment of the present invention.
Figure 2:
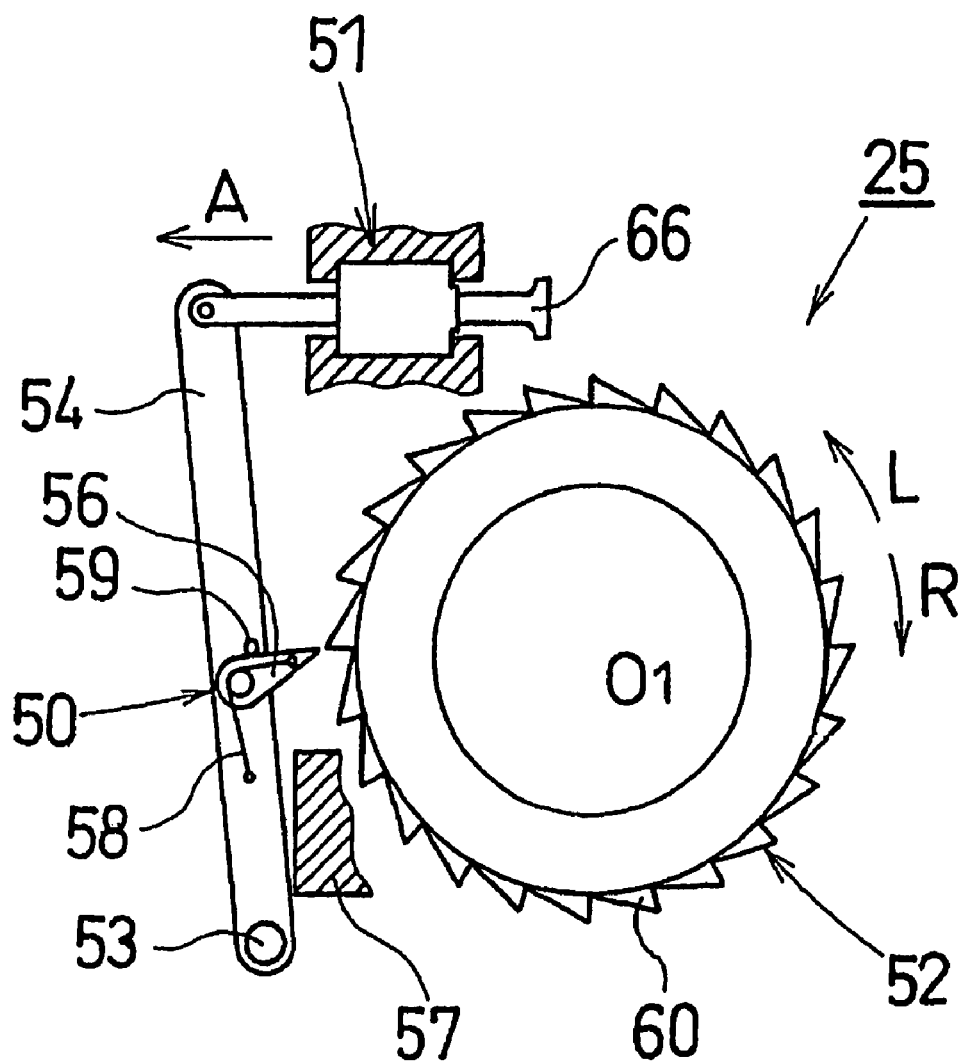
FIG. 2 is a schematic diagram indicating an unlocked condition of the park braking lock mechanism of FIG. 1.
Figure 3:
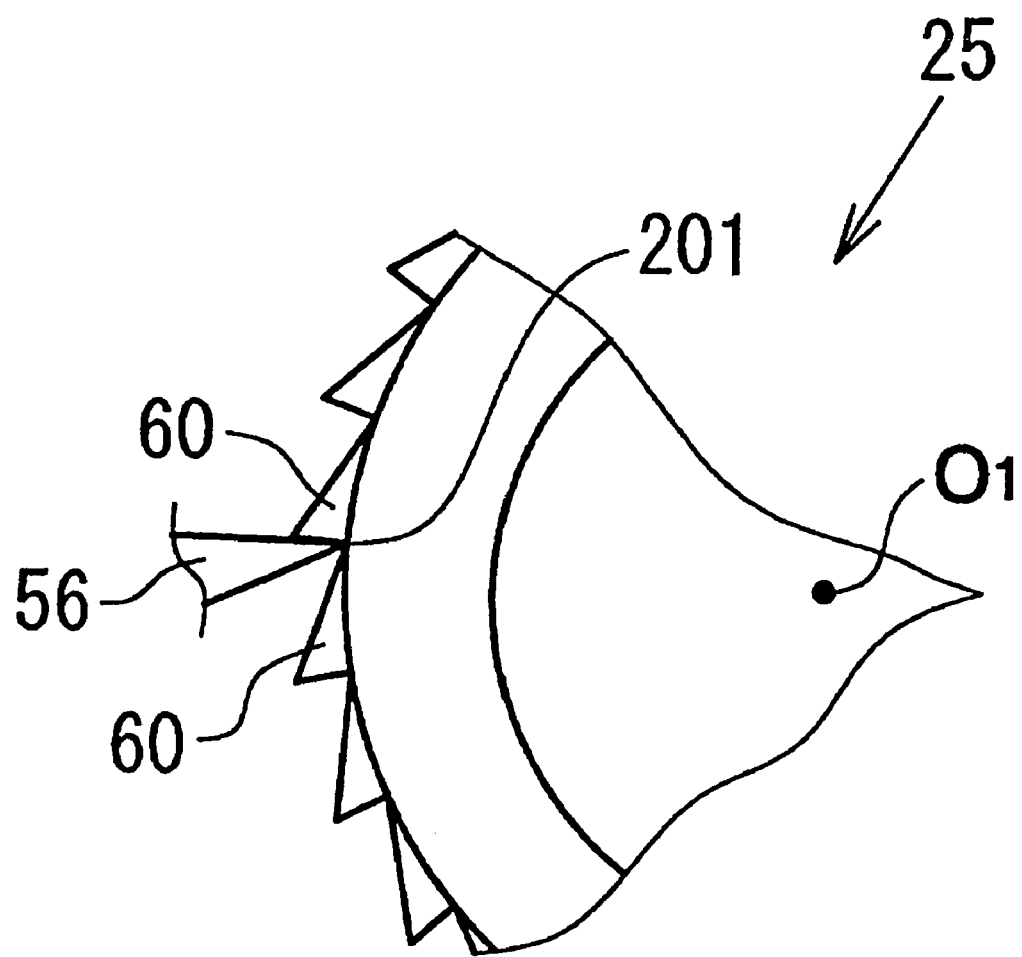
FIG. 3 is an enlarged view of a part of FIG. 1.

As is clearly shown in FIGS. 1 to 3, the park braking lock mechanism 25 generally comprises a lock mechanism 50 capable of locking and unlocking the rotor 44 of the motor 21 with respect to rotation in a direction L for releasing the brake, and also comprises the solenoid 51 as an actuator for effecting a locking/unlocking action of the lock mechanism 50.

The lock mechanism 50 comprises a ratchet wheel 52 which is integral with an outer circumferential surface of the rotor 44 and therefore rotates with the rotor 44 of the motor 21. The lock mechanism 50 further comprises: a pivot arm 54 provided at a periphery of the ratchet wheel 52, and having a basal end thereof pivotably connected to the caliper body 10 by means of a pin 53; an engaging pawl 56 having a basal end thereof pivotably connected to a longitudinally intermediate portion of the pivot arm 54 using a pin 55; a stopper portion 57 provided in the caliper body 10 and adapted to abut against a side surface of the pivot arm 54 to thereby erect the pivot arm 54 in a tangential direction of the rotor 44; a torsion spring 58 for providing a biasing force acting on the engaging pawl 56 in a counterclockwise direction in FIG. 1; and a projection 59 which cooperates with the torsion spring 58 to hold the engaging pawl 56 in an erected position that enables engagement between the engaging pawl 56 and the ratchet wheel 52. Each tooth portion 60 of the ratchet wheel 52 is configured such that a tooth face 60a faces forward with respect to the direction L of rotation of the rotor 44 for releasing the brake (a counterclockwise direction as viewed from the right side in FIG. 4), and an inclined relieved surface 60b faces forward with respect to the direction R of rotation of the rotor 44 for applying the brake (a clockwise direction as viewed from the right side in FIG. 4).

Figure 5:
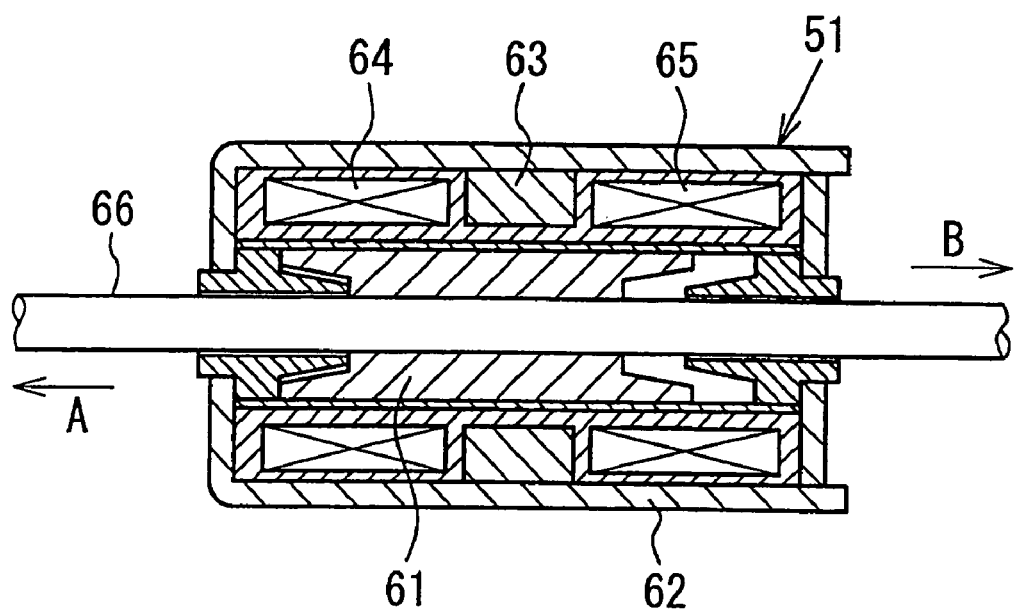
FIG. 5 is a cross-sectional view showing a structure of a self-holding type solenoid in FIG. 1.

As shown in FIG. 5, the solenoid 51 is formed by a housing 62 in which a plunger 61 is slidably accommodated, two coils 64 and 65 provided in the housing 62 and connected in series, with a permanent magnet 63 being held therebetween, and a rod 66 supported by the plunger 61. By changing the direction of a current supplied to the coils 64 and 65, the plunger 61 is moved in one of two directions A and B, and held in a forward end position or a retracted end position under an attracting force of the permanent magnet 63.

As indicated in FIGS. 1 to 3, the park braking lock mechanism 25 is arranged such that the solenoid 51 is provided in the caliper body 10, and one end of the rod 66 integral with the plunger 61 is pinned to a forward end portion of the pivot arm 54 on a side of the lock mechanism 50.

In the park braking lock mechanism 25 arranged as mentioned above, when the solenoid 51 (the coils 64 and 65) is supplied with a current in one direction (a direction for unlocking), the rod 66, together with the plunger 61, moves in the leftward direction A in FIG. 2 (an advancing direction), and the pivot arm 54 pivotally moves away from the rotor 44, to thereby disengage a forward end portion of the engaging pawl 56 from the tooth portion 60 of the ratchet wheel 52. That is, the lock mechanism 50 performs an unlocking action, and consequently the rotor 44 becomes freely rotatable in either the direction L for releasing the brake or the direction R for braking. In this case, the plunger 61 is maintained at the forward end position even after deenergization. Therefore, temporary energization of the coil 64 can be employed. In this state, when the solenoid 51 (the coils 64 and 65) is supplied with a current in the other direction (a direction for locking), the rod 66, together with the plunger 61, moves in the rightward direction B in FIG. 1 (a retracting direction; a direction for locking), and the pivot arm 54 moves towards the rotor 44, thus bringing the forward end portion of the engaging pawl 56 into engagement with the tooth portion 60 of the ratchet wheel 52. That is, the lock mechanism 50 performs a locking action, and consequently the rotor 44 is prevented from rotating in the direction L for releasing the brake. In this case, since the plunger 61 is maintained at the retracted end position even after deenergization, temporary energization of the coil 65 can be employed.

As indicated in FIG. 6, power is supplied from a power source 102 through the driver circuit 103 to the solenoid 51. The driver circuit 103 is controlled by the controller 100 to operate the solenoid 51. Power is also supplied from the power source 102 through the driver circuit 103 to the motor 21. The driver circuit 103 is controlled by the controller 100 to operate the motor 21. Thus, the driver circuit 103 functions as both a solenoid driver and a motor driver. The driver circuit 103 and the angular position sensor 42 are connected to the controller 100. The controller 100 is also connected to the reactive force sensor 33, a pedaling force sensor 105, a park braking on/off switch 106, a speaker 107 and an alarm lamp 108.

The motor-driven disk brake system of the present invention reliably exerts a locking function to apply park braking (PKB). In this embodiment, to apply park braking (PKB), the controller 100 executes an operation indicated in FIG. 8.

Figure 8:
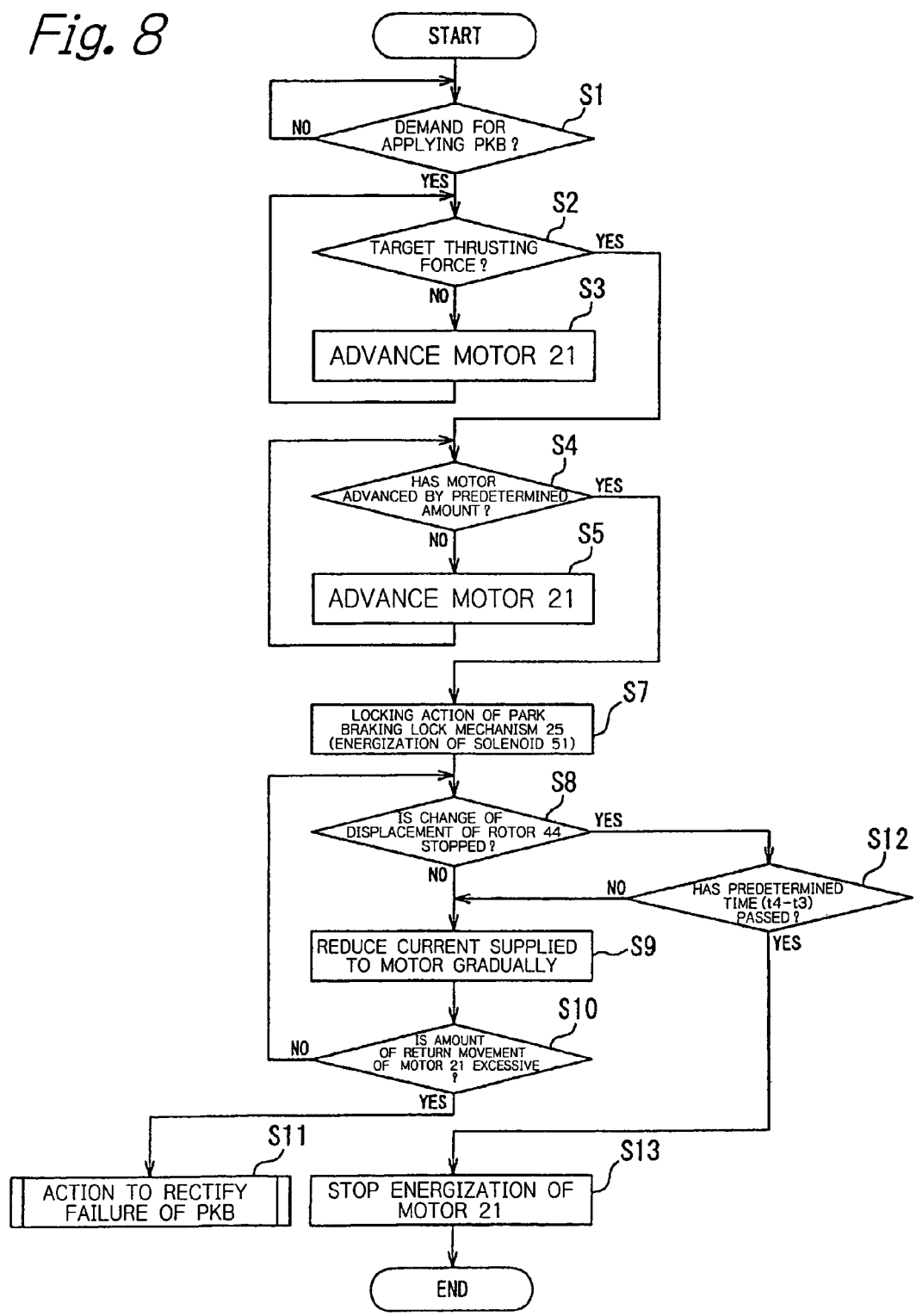
FIG. 8 is a flow chart indicating operations carried out by the controller of FIG. 6 in applying park braking.

That is, as indicated in FIG. 8, the controller 100 determines a presence/absence of a demand for applying PKB, based on a signal (an on/off signal) from the park braking on/off switch 106 (step S1). In step S1, if the controller determines a presence of a demand for applying PKB (the controller detects a demand for applying PKB), steps S2 and S3 are carried out to operate (advance) the motor 21 in a direction for generating a braking force (rotate the rotor 44 in the direction R for braking). This operation in steps S2 and S3 is repeated until a thrusting force generated by the motor 21 reaches a target thrusting force, that is, until a braking force generated by the motor 21 reaches a target value.

In step 2, in which it is determined whether a thrusting force generated by the motor 21 has reached the target thrusting force, if the answer is Yes, step S4 and step S5 are carried out, in which the rotor 44 is advanced by a predetermined amount equal to a length corresponding to 1 pitch of the ratchet wheel 52, i.e., one projection of the tooth portion 60 (that is, the rotor 44 is rotated by the predetermined amount). This operation in steps S4 and S5 is repeated until the rotor 44 advances by the predetermined amount, that is, until the amount of rotation of the rotor 44 reaches the predetermined amount.

In step 4, in which it is determined whether the motor 21 (the rotor 44) has advanced (the rotor 44 has rotated in the direction R for braking) by the predetermined amount, if the answer is Yes, the solenoid 51 (the coils 64 and 65) is supplied with a current in the direction for locking (step S7).

After step S7, it is determined whether a change of displacement of the rotor 44 of the motor 21 (the ratchet wheel 52) is stopped (the position of the motor is fixed) (step S8), and the current supplied to the motor is reduced (step S9). The current supplied to the motor is gradually reduced until the rotor 44 of the motor 21 (the ratchet wheel 52) stops. When the current supplied to the motor is gradually reduced (step S9), due to reversibility of the caliper 4, the piston 20 (the motor 21) gradually returns in a direction for decreasing the braking force. That is, the rotor 44 (the ratchet wheel 52) rotates in the direction L for releasing the brake.

A change of displacement of the rotor 44 (the ratchet wheel 52) to be determined in step S8 is detected by detecting a change in a value detected by the angular position sensor 42.

In step S10 subsequent to step S9, it is determined whether the amount of return movement of the piston 20 (the motor 21) generated according to the operation in step S9 is excessive (the motor has returned by an amount equal to or greater than a predetermined amount). In step S10, if the answer is No, the program returns to step S8. In step S10, if the answer is Yes (the motor has returned by an amount equal to or greater than the predetermined amount), it is determined that the lock mechanism 50 is defective, and an operation for rectifying the failure of operation of the lock mechanism 50 is conducted (an alarm is given by means of the speaker 107 and the alarm lamp 108) (step S11).

In this embodiment, steps S8 and S10 provide locking/unlocking failure detection means that detects a locking failure. In the present invention, an arrangement of the locking/unlocking failure detection means can be simplified by omitting step S9 for gradually reducing the current supplied to the motor 21 and eliminating step S8. In this case, the locking/unlocking failure detection means is formed only by step S10.

Figure 9:
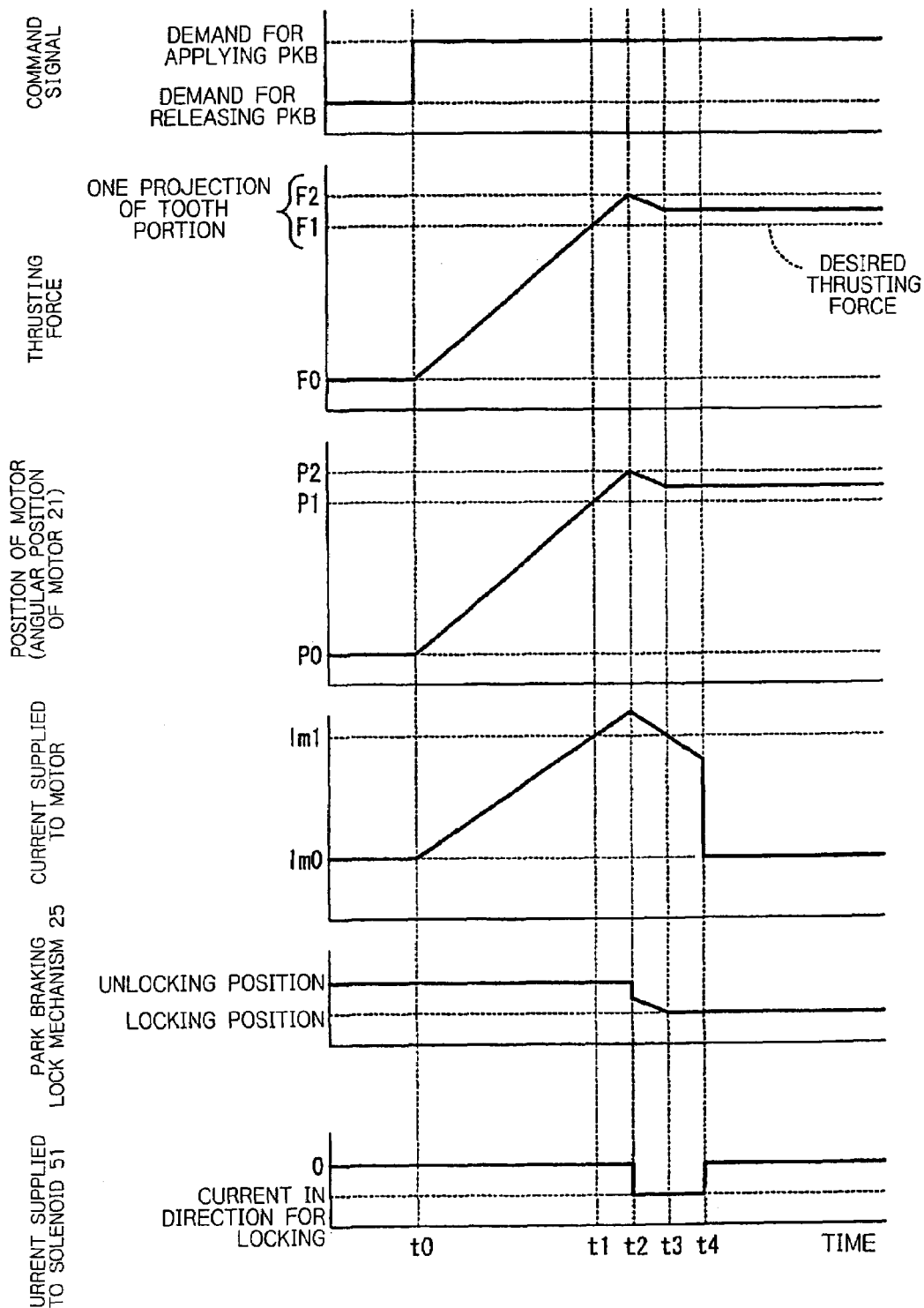
FIG. 9 is a time chart indicating the timing of the operations in FIG. 8 in applying park braking.

In step S8, if the answer is Yes, it is determined whether a predetermined time [(t4–t3); see FIG. 9] has passed (step S12). In step S12, if the answer is No, step S9 is carried out, in which the current supplied to the motor is gradually reduced, and the rotor 44 is rotated in the direction L for releasing the brake.

In step S12, if the answer is Yes [the predetermined time (t4–t3) has passed], step S13 is carried out, in which the motor 21 and the solenoid 51 (the coils 64 and 65) are deenergized, thus completing the operation for applying park braking. It should be noted that steps S8 and S12 provide locked/unlocked condition detection means that detects a locked condition of the park braking lock mechanism.

Hereinbelow, an operation of the motor-driven disk brake system arranged as mentioned above is described. There are four modes of operation, namely, (1) an operation for applying normal braking, (2) an operation for releasing normal braking, (3) an operation for applying park braking (PKB), and (4) an operation for detecting a failure when park braking (PKB) is applied.

(1) An Operation for Applying Normal Braking

For normal braking in which the motor-driven brake is operated, the rotor 44 of the motor 21 is rotated in a clockwise direction as viewed from the right side in FIG. 4, according to a driver's operation for applying the brake. In this instance, as indicated in FIG. 2, in the solenoid 51 of the park braking lock mechanism 25, the rod 66 which is integral with the plunger 61 is located in a forward end position. The lock mechanism 50 is maintained in an unlocked condition (corresponding to a disengaged position of the engaging pawl relative to the ratchet wheel), due to the self-holding function of the solenoid 51.

When the rotor 44 is rotated in the clockwise direction as described above, the ball ramp mechanism 22 is operated while the second disk 29 is prevented from rotating as described above, and the second disk 29 advances towards the disk rotor 2 according to rotation of the first disk 27. Consequently, the piston 20 thrusts, to thereby press the brake pad 5 on the inner side of the vehicle against the disk rotor 2. Then, a reactive force acts to move the caliper 4 towards the carrier 1, and the claw portion 7 of the caliper 4 presses the brake pad 6 on the outer side of the vehicle against an outer surface of the disk rotor 2, to thereby generate a braking force corresponding to the angle of rotation and the torque of the motor 21 (the current supplied to the motor). When the brake pads 5 and 6 become worn, the pad wear compensation mechanism 24 is operated to compensate for a space generated consequent on an amount of wear. During this braking, the plunger 61 is maintained in the forward end position while the solenoid 51 is placed in an non-energized condition, and the lock mechanism 50 is maintained in an unlocked condition.

(2) An Operation for Releasing Normal Braking

To release the motor-driven brake, that is, to release normal braking, according to the driver's operation for releasing the brake (an operation of the park braking on/off switch 106), the rotor 44 of the motor 21 is rotated in a counterclockwise direction as viewed from the right side in FIG. 4, and the second disk 29 and the piston 20 are retracted as a unit, to thereby release the force applied to the disk rotor 2 and thus release the motor-driven brake. In this instance, the self-holding type solenoid 51 is not energized; and the lock mechanism 50 of the park braking lock mechanism 25 is maintained in an unlocked condition, so that the rotor 44 smoothly rotates in the direction L (FIG. 2) for releasing the brake.

(3) An Operation for Applying Park Braking (PKB)

As indicated in FIG. 9, when a park braking operation is requested (a PKB-ON demand is generated) (time: t0), the motor 21 (the rotor 44) is rotated in a direction for generating a braking force (the clockwise direction R) to generate a thrusting force as requested (a target thrusting force) (time: t1). In this instance, if the engaging pawl 56 is moved towards the tooth portions 60 (the ratchet wheel 52), the engaging pawl 56 engages one tooth portion 60 (at a position corresponding to an engaged position of the engaging pawl relative to the ratchet wheel).

Thereafter, the motor 21 (the rotor 44) is further rotated in the same direction (the clockwise direction R) by a predetermined amount (equal to the above-mentioned predetermined amount which is equal to a length corresponding to 1 pitch of the ratchet wheel 52, that is, one projection of the tooth portion 60) (time: t2), to thereby generate a braking force greater than a desired level. Then, the solenoid 51 (the coils 64 and 65) is supplied with a current in a direction for locking, to thereby move the plunger 61 in the direction B (a direction for locking) and thus engage the engaging pawl 56 with the succeeding tooth portion 60 next to the above-mentioned one tooth portion 60. The engaging pawl 56 is biased towards this tooth portion 60, and this condition is maintained until time t4.

In this state, the current supplied to the motor 21 is gradually reduced, and as a function of reversibility of the caliper 4, the piston 20 (the motor 21 and hence the rotor 44) gradually returns in a direction for reducing the braking force (the direction L for releasing the brake).

Then, when the engaging pawl 56 reaches a tooth root 201 as indicated in FIG. 3, the rotation of the rotor 44 (the ratchet wheel 52) in the direction L for releasing the brake stops, and the piston 20 stops moving in a direction for reducing the braking force (time: t3).

The controller 100 detects a change in a value detected by the angular position sensor 42. With the lapse of a predetermined time period (t4–t3) from the point of time (time: t3) at which no amount of change exists (time: t4), the controller 100 determines that the park braking lock mechanism 25 is normally operated, and reduces magnitudes of the currents supplied to the motor 21 and the solenoid 51 (the coils 64 and 65) to 0 (OFF). Even when the magnitudes of the currents supplied to the motor 21 and the solenoid 51 (the coils 64 and 65) become 0 (OFF), the engaging pawl 56 is engaged with the tooth root 201. Therefore, a park braking function is exerted.

(4) An Operation for Detecting a Failure when Park Braking (PKB) is Applied

When the locking action of the park braking lock mechanism 25 is properly effected as described in item (3) above, a change of displacement of the rotor 44 of the motor 21 (the ratchet wheel 52) is stopped (the answer in step S8 in FIG. 8 is Yes). However, if the plunger 61 of the solenoid 51 is not properly operated to effect the locking action of the park braking lock mechanism 25, the parking brake lock mechanism 25 cannot be placed in a locked condition. In this case, in step S10 following step S9 in FIG. 8, an amount of return movement of the piston 20 (the motor 21) according to the operation in step S9 becomes excessive (the motor is moved by an amount equal to or exceeding a predetermined amount). Therefore, the answer in step S10 is Yes (it is determined that the motor 21 has returned by an amount equal to or exceeding the predetermined amount), and a failure of operation of the lock mechanism 50, i.e., a locking failure, is determined. In step S11, an operation for rectifying the failure of the lock mechanism 50 is conducted (an alarm is given by means of the speaker 107 and the alarm lamp 108).

Figure 10:
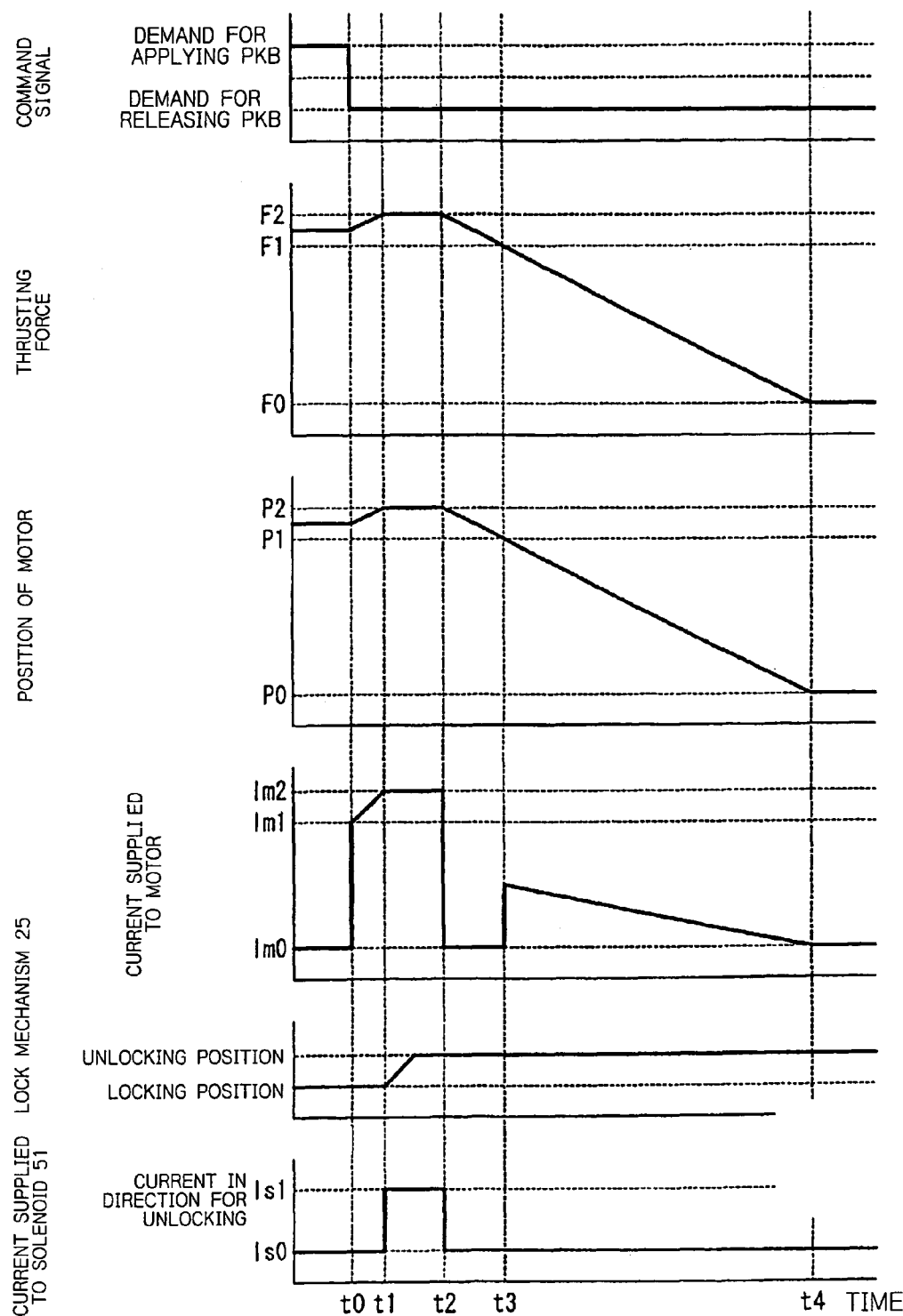
FIG. 10 is a time chart indicating the timing of operations of the controller of FIG. 6 in releasing park braking.
Figure 11:
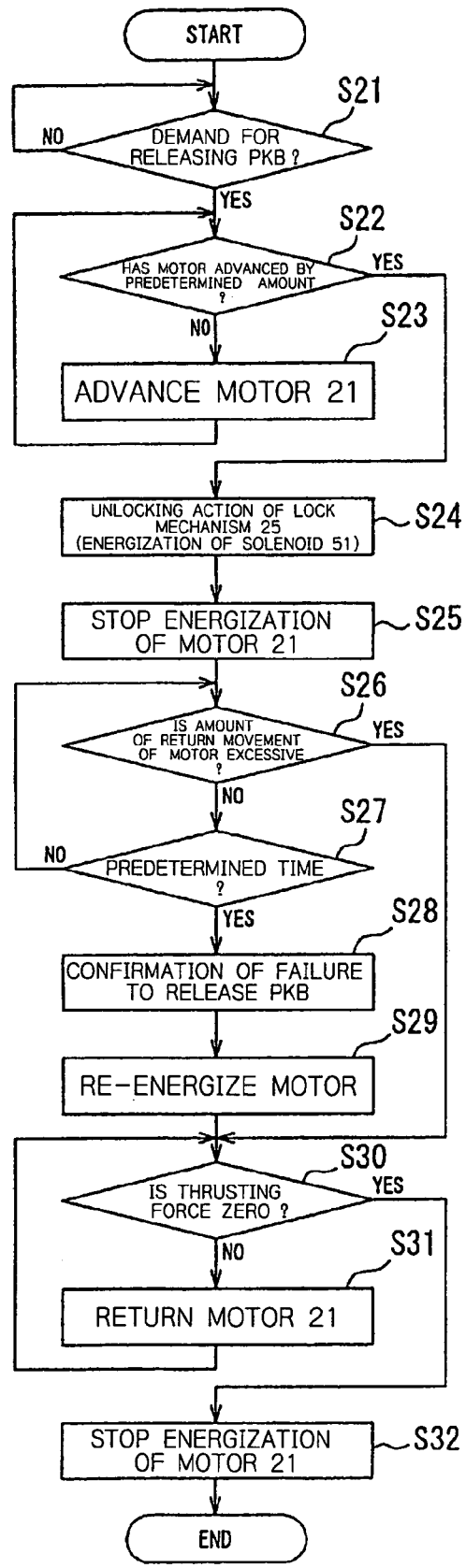
FIG. 11 is a flow chart indicating operations carried out by the controller of FIG. 6 in releasing park braking.
Figure 12:
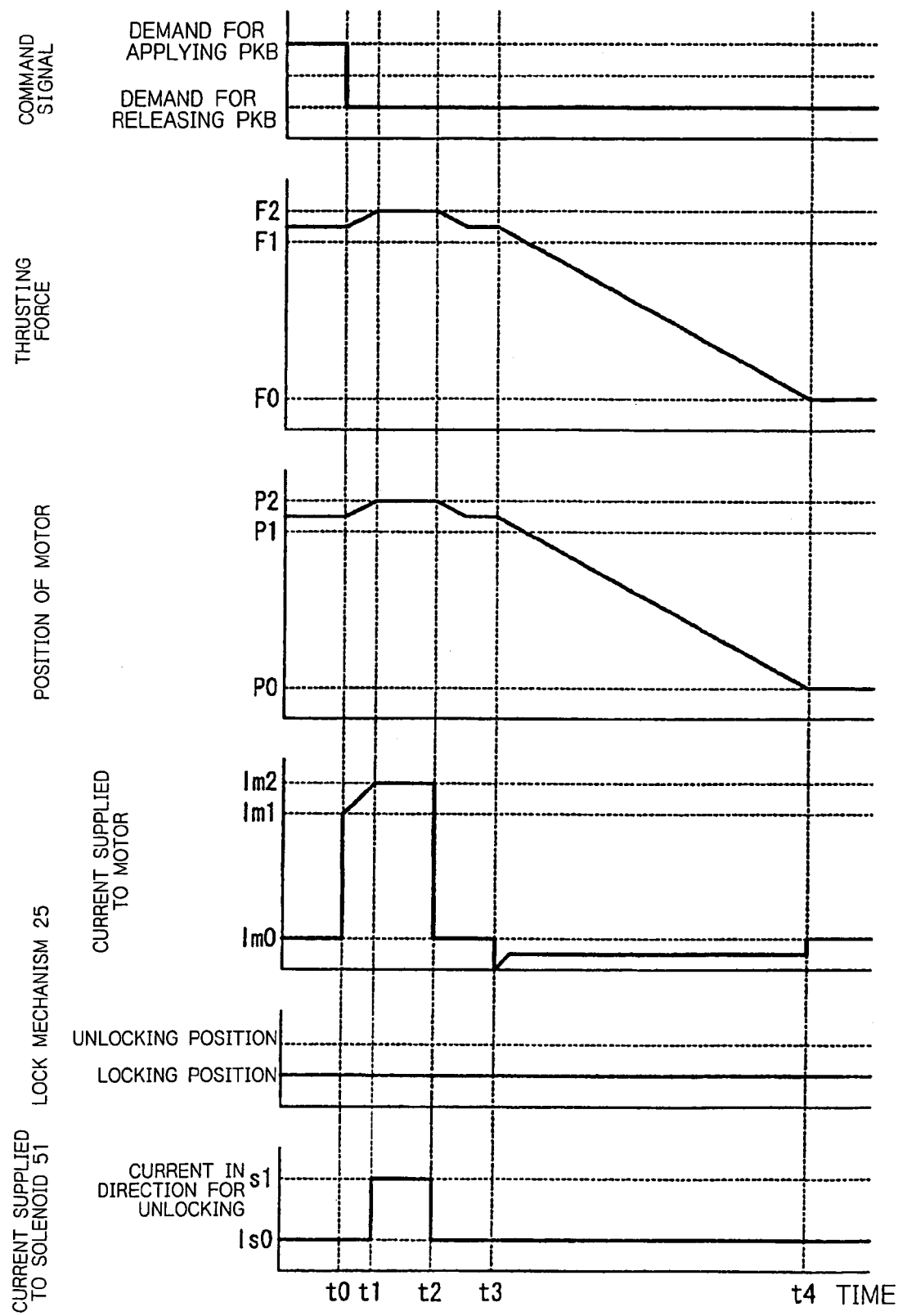
FIG. 12 is a time chart indicating an example of the timing of operations in releasing park braking when an unlocking failure in FIG. 11 is detected.

Next, referring to FIGS. 10 to 12, description is made with regard to an operation for unlocking park braking (PKB) of the motor-driven disk brake system of the present invention. In this embodiment, to release park braking (PKB), the controller 100 conducts an operation indicated in FIG. 11.

That is, as indicated in FIG. 11, the controller 100 determines whether a demand for releasing PKB has been generated by operating the park braking on/off switch (PKB switch) 106 (step S21). In step S21, if the answer is YES (it is determined that a demand for releasing PKB has been generated), the motor is energized (FIG. 10; time: t0). In steps S22 and S23, the rotor 44 of the motor 21 is advanced by a predetermined amount (in an example of FIG. 10, the rotor 44 of the motor 21 is advanced by a predetermined amount corresponding to an amount of movement from an intermediate position between a position P1 and a position P2 to the position P2, so that the position of the motor becomes the position P2), thereby making it easy to release the locked condition of the park braking lock mechanism 25. That is, in step S22 following step S21, it is determined whether the motor 21 has advanced by the predetermined amount. In step S22, if the answer is NO (it is determined that the motor 21 has not advanced by the predetermined amount), the program returns to step S22. In step S22, if the answer is YES (it is determined that the motor 21 has advanced by the predetermined amount), the program advances to step S24.

In step S24, to release the locked condition of the park braking lock mechanism 25, energization of the solenoid 51 is started (time: t1). The energization of the solenoid 51 is conducted for a predetermined period of time (t2−t1). Thereafter, the energization of the motor 21 and the solenoid 51 is stopped (step S25; time: t2).

After step S25, the controller 100 calculates an amount of displacement of the rotor 44, based on position data detected by the angular position sensor 42, and then based on the thus calculated amount of displacement of the rotor 44, it is determined whether the rotor 44 of the motor 21 has returned by an amount equal to or exceeding a predetermined amount (step S26). If the answer in step S26 is NO (the rotor 44 has not returned by an amount equal to or exceeding the predetermined amount) and it is determined in step S27 that a predetermined period of time (t2−t1) has not passed, the program returns to step S26. If the answer in step S26 is YES (the rotor 44 has returned by an amount equal to or exceeding the predetermined amount), the program advances to step S30. In step S27, if the answer is YES (the predetermined period of time has passed), the program advances to step S28.

If the park braking lock mechanism 25 is normally operated to effect an unlocking action, as a result of a controlling operation as described above for releasing the locked condition of the park braking lock mechanism 25 (steps S24 and S25) and as a function of reversibility of the motor-driven caliper, the piston 20 (the motor 21) starts to return. Therefore, if the piston 20 (the motor 21) does not return even when the operation in steps S24 and S25 is conducted, it is expected that a failure has occurred, such as a malfunctioning of the solenoid 51, which is preventing the unlocking action of the park braking lock mechanism 25. In such a case, in this embodiment, occurrence of a failure of the park braking lock mechanism 25 to effect the unlocking action (an unlocking failure) is confirmed if the answer in step S26 is NO [the piston 20 (the motor 21) has not returned by an amount equal to or exceeding the predetermined amount within the predetermined period of time (t2−t1)] and the answer in step S27 is YES (the predetermined time period has passed). The confirmed unlocking failure is notified by means of the speaker 107 and the alarm lamp 108 (step S28).

In this embodiment, steps S26 and S27 provide locking/unlocking failure detection means to detect an unlocking failure, and step S26 provides locked/unlocked condition detection means to detect an unlocked condition of the park braking lock mechanism 25.

The park braking lock mechanism 25 is arranged such that even if an unlocking failure is detected by the above-mentioned operation, the piston 20 can be returned by generating a large motor torque. To this end, in the above embodiment, as is indicated in the chart of the motor current shown in FIG. 12, energization of the motor 21 is restarted at a time point t3 after step S28 by flowing a current, which has a greater value than is normally used, in a direction for forcibly returning the piston 20 (the motor 21) (step S29). In steps S30 and S31, based on data detected by the reactive force sensor 33, the rotor 44 of the motor 21 is returned until the thrusting force becomes zero. That is, in step S30, it is determined whether the thrusting force is zero. If the answer is NO (the thrusting force is not zero), the motor 21 is returned (step S31), and the program returns to step S30.

In step S30, if the answer is YES (the thrusting force is zero), energization of the motor 21 is stopped (step S32), thus completing the operation for releasing park braking.

Hereinbelow, description is made with regard to an unlocking action for park braking (PKB) of the motor-driven disk brake system in this embodiment. There are two modes of operations, namely, (5) an operation for releasing park braking (PKB) and (6) an operation for detecting an unlocking failure when park braking (PKB) is released.

(5) An Operation for Releasing Park Braking (PKB)

To release park braking, in response to a driver's operation for releasing park braking, the solenoid 51 (the coils 64 and 65) of the park braking lock mechanism 25 is temporarily supplied with a current in one direction (a direction for unlocking). Then, the rod 66, together with the plunger 61 in the solenoid 51, moves in the advancing direction A. As a result, the lock mechanism 50 is placed in an unlocked condition and, as indicated in FIG. 2, the rotor 44 becomes capable of freely rotating in the direction L for releasing the brake. In this instance, the motor 21 is not energized, so that the piston 20 is retracted due to a reactive force generated by braking, and accordingly the second disk 29 is retracted and the rotor 44 of the motor 21 is rotated in the counterclockwise direction as viewed from the right side in FIG. 4. The rotor 44 of the motor 21 thus returns to its original position, and park braking is released.

The timing of operations for an unlocking action of the park braking lock mechanism 25 is described, based on a time chart shown in FIG. 10.

When a PKB-OFF demand (a demand for releasing park braking) is generated at a time point t0, the motor 21 is operated by energization. While increasing a thrusting force, the rotor 44 of the motor 21 (the ratchet wheel 52) is rotated so that the position of the motor is changed from an intermediate position between the position P1 and the position P2 to the position P2. When the rotor 44 (the ratchet wheel 52) has been rotated by a predetermined amount (corresponding to one projection of the tooth portion) (time: t1), the solenoid 51 is energized, to thereby move the engaging pawl 56 to a position for unlocking.

Thereafter, the motor 21 is deenergized (time: t2), and when it is confirmed that the piston 20 has started to return within a predetermined period of time (t3–t2) as a function of reversibility of the motor-driven caliper, it is determined that an unlocking action of the park braking lock mechanism 25 has been normally effected. The motor 21 is re-energized using a predetermined current value, to thereby return the piston 20 (the motor 21), according to a predetermined pattern, to a position at which the thrusting force becomes zero.

(6) An Operation for Detecting an Unlocking Failure when Park Braking (PKB) is Released When the solenoid 51 (an electric actuator) is operated so as to move the engaging pawl 56 to the disengaged position in the above-mentioned manner (step S24), if the displacement detection means (the angular position sensor 42 and the controller 100) detects that the rotor 44 of the motor 21 has not been displaced by an amount equal to or exceeding a predetermined amount within a predetermined time period, that is, the answer is step S26 is NO [the piston 20 (the motor 21) has not returned by an amount equal to or exceeding the predetermined amount] and the answer in step S27 is YES [the predetermined time period (t2–t1) has passed], it is determined that the unlocked condition is defective (an unlocking failure of the park braking lock mechanism 25 occurs) (step S28). In this case, the driver is notified of the unlocking failure in step S28, so that prompt action can be taken to rectify the unlocking failure of the park braking lock mechanism 25. Thus, an appropriate countermeasure can be taken in the event of an unlocking failure which occurs, for example, due to malfunctioning of the plunger 62 of the solenoid 51, regardless of an operation of the park braking lock mechanism 25 for unlocking park braking.

As described above, detection of an unlocking failure of the park braking lock mechanism 25, based on results of detection made by the displacement detection means (the angular position sensor 42 and the controller 100), is conducted when the solenoid 51 (the electric actuator) is operated so as to move the engaging pawl 56 to the disengaged position (step S24) (that is, when the park braking lock mechanism 25 is operated so as to unlock park braking). Consequently, it is determined that the unlocked condition is defective (an unlocking failure occurs) when displacement of the motor 21 (the rotor 44) is not satisfactorily effected within a predetermined period of time contrary to expectation that displacement of the motor 21 (the rotor 44) will be readily conducted according to the operation for unlocking park braking (the answer in step S26 is NO and the answer in step S27 is YES). Therefore, the unlocking failure can be readily detected.

Further, since the unlocking failure of the park braking lock mechanism 25 can be detected, it is possible to forcibly drive the motor 21 and hence the piston 20 when the unlocking failure has been detected, as in step S29 and the subsequent steps indicated in FIG. 11. It is also possible to stop the motor 21 without carrying out step S29 and the subsequent steps shown in FIG. 11. In this case, it is possible to avoid generation of pronounced noise which would be otherwise generated when the engaging pawl 56 passes the tooth portion 60 while the thrusting force is reduced.

In item (4) above, an operation for detecting a failure when park braking (PKB) is applied is described. For operations in steps S8 to S11 in FIG. 8 for detecting a locking failure when park braking (PKB) is applied, which are described in item (4) above, step S26A used instead of step S26 in FIG. 11, step S27 in FIG. 11, and step S28A used instead of step S28 in FIG. 11, may be employed. Step S26A and step S28A are described later. That is, steps S8 to S11 in FIG. 8 may be replaced by step S26A described later, step S27 in FIG. 11 and step S28A described later.

In step S26A, the controller 100 calculates an amount of displacement of the rotor 44, based on position data detected by the angular position sensor 42. Based on the thus calculated amount of displacement of the rotor 44, the controller 100 determines whether the rotor 44 of the motor 21 has not returned by an amount equal to or exceeding a predetermined amount (YES) or has returned by an amount equal to or exceeding the predetermined amount (NO).

In step S28A, if the answer in step S26A is NO (the rotor 44 has returned by an amount equal to or exceeding the predetermined amount), and if the answer in step S27 is YES (the predetermined time period has passed), determination of occurrence of a locking failure of the park braking lock mechanism 25 is confirmed. The confirmed locking failure is notified using the speaker 107 and the alarm lamp 108.

In a case that step S26A, step S27 in FIG. 11 and step S28A are employed in an operation in item (4) for detecting a failure when park braking (PKB) is applied (steps S8 to S11 in FIG. 8), when the PKB-ON demand is applied to the solenoid 51 (the electric actuator) so as to move the engaging pawl 56 to the engaged position, and the displacement detection means (the angular position sensor 42 and the controller 100) detects that the rotor 44 of the motor 21 has been displaced by an amount equal to or exceeding the predetermined amount, it is determined that the locked condition is defective (a locking failure of the park braking lock mechanism 25 occurs).

In this case, the driver is notified of the locking failure, so that prompt action can be taken to rectify the locking failure of the park braking lock mechanism 25. Thus, an appropriate countermeasure can be taken in the event of a locking failure which occurs, for example, due to malfunctioning of the plunger 62 of the solenoid 51, regardless of an operation of the park braking lock mechanism 25 for locking park braking.

In this case, detection of a locking failure of the park braking lock mechanism 25, based on results of detection made by the displacement detection means (the angular position sensor 42 and the controller 100), is conducted when the solenoid 51 (the electric actuator) is operated so as to move the engaging pawl 56 to the engaged position (that is, when the park braking lock mechanism 25 is operated so as to lock park braking). When the park braking lock mechanism 25 is operated to lock park braking, it is expected that displacement of the motor 21 (the rotor 44) will become difficult. When, contrary to this expectation, the motor 21 (the rotor 44) is easily displaced, it is determined that the locked condition is defective (a locking failure occurs). Therefore, a locking failure can be readily detected.

In the above embodiment, detection of a failure when park braking (PKB) is applied is conducted when the park braking lock mechanism 25 is operated so as to lock park braking. However, this does not limit the present invention. An operation for detection may be conducted while park braking (PKB) is applied. In this case, a locking failure is notified when the motor 21 has returned by an amount equal to or exceeding a predetermined amount.

In the above embodiment, as the electric actuator, use is made of the bidirectional self-holding type solenoid 51. However, this also does not limit the present invention. A spring may be also used, which is adapted to bias the engaging pawl towards either one of the engaged position and the disengaged position relative to the ratchet wheel. In this case, the solenoid may be of a type which moves the engaging pawl against the biasing force of the spring.

To determine whether the park braking lock mechanism is supposed to be placed in a locked condition, the PKB-ON demand in step S1 or a command signal for energization of the solenoid 51 in step S7 in FIG. 8 may be used. Similarly, to determine whether the park braking lock mechanism is supposed to be placed in an unlocked condition, the PKB-OFF demand in step S21 or a command signal for energization of the solenoid 51 in step S24 in FIG. 11 may be used.

In the above embodiment, a locking/unlocking failure of the park braking lock mechanism is detected, based on the results of detection made by the displacement detection means. Therefore, when it is expected that displacement of the rotor of the motor will be difficult due to the operation for locking park braking, and the results of detection made by the displacement detection means indicate that displacement of the rotor has been readily conducted, a locking failure of the park braking lock mechanism can be determined, thus enabling prompt action to be taken to rectify the locking failure. When easy displacement of the rotor of the motor is expected according to the operation for unlocking park braking, and the results of detection made by the displacement detection means indicate that displacement of the rotor is difficult, an unlocking failure of the park braking lock mechanism can be determined, thus enabling prompt action to be taken to rectify the unlocking failure.

In the above embodiment, a defect in a locked/unlocked condition of the park braking lock mechanism 25 is detected, based on the results of detection made by the displacement detection means. Instead of the displacement detection means, the reactive force sensor (thrust sensor) 33 may be used. In this case, the controller 100 comprises locking/unlocking failure detection means adapted to detect a locking failure or an unlocking failure of the park braking lock mechanism 25, based on results of detection made by the reactive force sensor 33.

Description is made below with regard to an embodiment in which a defect in a locked/unlocked condition is detected using the reactive force sensor 33. To detect a locking failure, instead of carrying out steps S8 to S10 in FIG. 8, it is detected whether a thrusting force detected by the reactive force sensor 33 has been reduced by a predetermined amount when the park braking lock mechanism 25 is supposed to be placed in a locked condition. If it is detected that the thrusting force of the reactive force sensor 33 has been reduced by an amount equal to or exceeding the predetermined amount, the locking/unlocking failure detection means (the controller 100) determines occurrence of a locking failure. To detect an unlocking failure, instead of carrying out steps S26 and S27 in FIG. 11, it is detected whether the thrusting force of the reactive force sensor 33 has been reduced by a predetermined amount within a predetermined time period when the park braking lock mechanism 25 is supposed to be placed in an unlocked condition. If it is not detected that the thrusting force of the reactive force sensor 33 has been reduced by an amount equal to or exceeding the predetermined amount within the predetermined time period, the locking/unlocking failure detection means (the controller 100) determines occurrence of an unlocking failure.

Thus, in this embodiment, a locking/unlocking failure of the park braking lock mechanism is detected, based on the results of detection made by the thrust sensor. Therefore, when it is expected that displacement of the rotor of the motor will become difficult due to the operation for locking park braking, and the results of detection made by the thrust sensor indicate that the displacement of the rotor has been readily conducted, a locking failure of the park braking lock mechanism can be determined, thus enabling prompt action to be taken to rectify the locking failure of the park braking lock mechanism. When easy displacement of the rotor of the motor is expected according to the operation for unlocking park braking, and the results of detection made by the thrust sensor indicate that the displacement of the rotor is difficult, an unlocking failure of the park braking lock mechanism can be determined, thus enabling prompt action to be taken to rectify the unlocking failure of the park braking lock mechanism.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The entire disclosure of Japanese Patent Applications No. 2004-149262 filed on May 19, 2004 and No. 2004-252139 filed on Aug. 31, 2004 including specifications, claims, drawings and summaries are incorporated herein by reference in its entirety.

What is claimed is:

1. A motor-driven disk brake system comprising:
a piston;
a motor;
a rotary-linear motion converting mechanism for enabling rotation of a rotor of the motor to be converted to a linear motion and transmitted to the piston;
a caliper for pressing a brake pad against a disk rotor and thus generating a braking force when a thrust of the piston is generated according to the rotation of the rotor of the motor;
a park braking lock mechanism including a ratchet wheel and an engaging pawl, the ratchet wheel being adapted to be driven by the rotor of the motor, the park braking lock mechanism moving the engaging pawl to at least one of an engaged position relative to the ratchet wheel and a disengaged position relative to the ratchet wheel to effect a locking action and an unlocking action; and
a controller adapted to effect the locking action or the unlocking action of the park braking lock mechanism according to movement of the engaging pawl,
the caliper including displacement detection means adapted to detect displacement of the rotor of the motor,
the controller including unlocking failure detection means adapted to detect an unlocking failure of the park braking lock mechanism, based on results of a detection made by the displacement detection means,
wherein the unlocking failure detection means is operable to determine the occurrence of an unlocking failure of the park braking lock mechanism, but not an occurrence of a failure of the motor itself for applying the braking force, when the displacement detection means does not detect a displacement of the rotor of the motor while the controller is put in operation such that the engaging pawl moves to the disengaged position relative to the ratchet wheel to effect the unlocking action.

2. A motor-driven disk brake system according to claim 1, wherein the unlocking failure detection means is further operable to determine the occurrence of a locking failure of the park braking lock mechanism, when the displacement detection means detects that the rotor of the motor has been displaced in a direction of rotation of the rotor for releasing the braking force by an amount equal to or greater than a predetermined amount while the park braking lock mechanism is supposed to be placed in a locked condition.

3. A motor-driven disk brake system according to claim 1, wherein the the controller deenergizes the motor or reduces current supplied to the motor, after the controller energizes the motor to once increase a thrust force of the piston to release the engaging condition of the engaging pawl with the ratchet wheel such that the park braking lock mechanism effects the unlocking action and the park braking lock mechanism is placed in a locked condition.

4. A motor-driven disk brake system according to claim 3, wherein the unlocking failure detection means is operable to determine occurrence of an unlocking failure of the park braking lock mechanism when the park braking lock mechanism is put in operation from a locked condition to an unlocked condition and the displacement detection means does not detect an amount of displacement of the rotor of the motor that is equal to or greater than a predetermined amount in a direction of rotation of the rotor for releasing the braking force within a predetermined period of time.

5. A motor-driven disk brake system according to claim 1, wherein to effect a locking action of the park braking lock mechanism, a desired amount of braking force is first generated by means of the motor, and then the engaging pawl is engaged with one tooth portion of the ratchet wheel by means of the controller controlling the park braking lock mechanism, followed by reducing a torque generated by the motor, to thereby rotate the ratchet wheel in a direction opposite to a direction for generating the braking force and thus engaging the engaging pawl with a tooth root formed by the one tooth portion and a tooth portion adjacent to the one tooth portion.

6. A motor-driven disk brake system according to claim 5, wherein after the desired amount of braking force is generated by means of the motor and before the engaging pawl is engaged with the one tooth portion of the ratchet wheel, the rotor of the motor is rotated by a predetermined amount in a direction for increasing the braking force.

7. A motor-driven disk brake system according to claim 6, wherein the predetermined amount is equal to a length corresponding to 1 pitch of the ratchet wheel.

8. A motor-driven disk brake system according to claim 5, wherein while the torque generated by the motor is gradually reduced, the engaging pawl is biased in a direction for engagement with the one tooth portion of the ratchet wheel.

9. A motor-driven disk brake system according to claim 1, wherein the unlocking failure detection means determines an occurrence of a locking failure of the park braking lock mechanism, when the displacement detection means detects that the rotor of the motor has been displaced in a direction of rotation of the rotor for releasing the braking force by an amount equal to or greater than a predetermined amount while the controller is put in operation of controlling the park braking lock mechanism such that the engaging pawl moves to the engaged position relative to the ratchet wheel to effect the locking action 10. A motor-driven disk brake system, comprising:
a piston;
a motor;
a rotary-linear motion converting mechanism for enabling rotation of a rotor of the motor to be converted to a linear motion and transmitted to the piston;
a caliper for pressing a brake pad against a disk rotor and thus generating a braking force when a thrust of the piston is generated according to the rotation of the rotor of the motor;
a park braking lock mechanism including a ratchet wheel, an engaging pawl and an electric actuator, the ratchet wheel being adapted to be driven by the rotor of the motor, the engaging pawl being disposed at a periphery of the ratchet wheel, the electric actuator being adapted to move the engaging pawl to at least one of an engaged position relative to the ratchet wheel and a disengaged position relative to the ratchet wheel; and
a controller adapted to send a command signal to the electric actuator so as to effect at least one of a locking action or an unlocking action of the park braking lock mechanism according to movement of the engaging pawl to the engaged position or the disengaged position,
the caliper including a thrust sensor adapted to sense a thrusting force of the piston,
the controller including locking/unlocking failure detection means adapted to detect a locking failure or an unlocking failure of the park braking lock mechanism, based on results of detection made by the thrust sensor,
wherein the locking/unlocking failure detection means is operable to determine at least one of:
an occurrence of a locking failure of the park braking lock mechanism, but not an occurrence of a failure of the motor itself for applying the braking force, when the thrusting force detected by the thrust sensor has been reduced by an amount equal to or greater than a predetermined amount while the controller is put in operation such that the engaging pawl moves to the engaged position relative to the ratchet wheel to effect the locking action; and
an occurrence of an unlocking failure of the park braking lock mechanism, but not an occurrence of a failure of the motor itself for applying the braking force, when the thrusting force detected by the thrust sensor is not reduced by an amount equal to or greater than the predetermined amount while the controller is put in operation such that the engaging pawl moves to the disengaged position relative to the ratchet wheel to effect the unlocking action.

11. A motor-driven disk brake system comprising:
a piston;
a motor;
a rotary-linear motion converting mechanism for enabling rotation of a rotor of the motor to be converted to a linear motion and transmitted to the piston;
a caliper for pressing a brake pad against a disk rotor and thus generating a braking force when a thrust of the piston is generated according to the rotation of the rotor of the motor;
a park braking lock mechanism including a ratchet wheel, an engaging pawl and an electric actuator, the ratchet wheel being adapted to be driven by the rotor of the motor, the engaging pawl being disposed at a periphery of the ratchet wheel, the electric actuator being adapted to move the engaging pawl to at least one of an engaged position relative to the ratchet wheel and a disengaged position relative to the ratchet wheel; and
a controller adapted to send a command signal to the electric actuator so as to effect at least one of a locking action or an unlocking action of the park braking lock mechanism according to movement of the engaging pawl to the engaged position or the disengaged position, the caliper including displacement detection means adapted to detect displacement of the rotor of the motor, the controller including unlocking failure detection means adapted to detect an unlocking failure of the park braking lock mechanism, based on results of a detection made by the displacement detection means, wherein the unlocking failure detection means is operable to determine the occurrence of an unlocking failure of the park braking lock mechanism under a condition where the motor for applying the braking force is operating normally, when the controller is put in operation such that the engaging pawl moves to the disengaged position relative to the ratchet wheel to effect the unlocking action and the displacement detection means does not detect the displacement of the rotor of the motor.

12. A motor-driven disk brake system according to claim 11, wherein the unlocking failure detection means is operable to determine occurrence of an unlocking failure of the park braking lock mechanism when the controller is put in operation such that the engaging pawl moves to the disengaged position relative to the ratchet wheel to effect the unlocking action and the displacement detection means does not detect an amount of displacement of the rotor of the motor that is equal to or greater than a predetermined amount in a direction of rotation of the rotor for releasing the braking force within a predetermined period of time.

13. A motor-driven disk brake system according to claim 11, wherein to effect a locking action of the park braking lock mechanism, a desired amount of braking force is first generated by means of the motor, and then the engaging pawl is engaged with one tooth portion of the ratchet wheel by means of the actuator, followed by reducing a torque generated by the motor, to thereby rotate the ratchet wheel in a direction opposite to a direction for generating the braking force and thus engaging the engaging pawl with a tooth root formed by the one tooth portion and a tooth portion adjacent to the one tooth portion.

14. A motor-driven disk brake system according to claim 13, wherein after the desired amount of braking force is generated by means of the motor and before the engaging pawl is engaged with the one tooth portion of the ratchet wheel, the rotor of the motor is rotated by a predetermined amount in a direction for increasing the braking force.

15. A motor-driven disk brake system according to claim 14, wherein the predetermined amount is equal to a length corresponding to 1 pitch of the ratchet wheel.

16. A motor-driven disk brake system according to claim 13, wherein while the torque generated by the motor is gradually reduced, the actuator biases the engaging pawl in a direction for engagement with the one tooth portion of the ratchet wheel.

17. A motor-driven disk brake system according to claim 11, wherein the unlocking failure detection means is operable to determine an occurrence of a locking failure of the park braking lock mechanism, when the displacement detection means detects that the rotor of the motor has been displaced in a direction of rotation of the rotor for releasing the braking force by an amount equal to or greater than a predetermined amount while the controller is put in operation such that the engaging pawl moves to the engaged position relative to the ratchet wheel to effect the locking action.

18. A motor-driven disk brake system according to claim 12, wherein the controller is operable to deenergize the motor or reduce current supplied to the motor, after the controller energizes the motor to once increase a thrust force of the piston to release the engaging condition of the engaging pawl with the ratchet wheel such that the park braking lock mechanism effects the unlocking action and the park braking lock mechanism is placed in a locked condition.

* * * * *